United States Patent
Kim et al.

(10) Patent No.: US 9,575,955 B2
(45) Date of Patent: Feb. 21, 2017

(54) METHOD OF DETECTING GRAMMATICAL ERROR, ERROR DETECTING APPARATUS FOR THE METHOD, AND COMPUTER-READABLE RECORDING MEDIUM STORING THE METHOD

(71) Applicant: SK TELECOM CO., LTD., Seoul (KR)

(72) Inventors: Seunghwan Kim, Seongnam-si (KR); Sung Kim, Seongnam-si (KR); Seongmook Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 73 days.

(21) Appl. No.: 14/615,304

(22) Filed: Feb. 5, 2015

(65) Prior Publication Data

US 2015/0154173 A1    Jun. 4, 2015

Related U.S. Application Data

(63) Continuation of application No. PCT/KR2013/005402, filed on Jun. 19, 2013.

(30) Foreign Application Priority Data

Aug. 10, 2012    (KR) ........................ 10-2012-0087788

(51) Int. Cl.
     *G06F 17/27*      (2006.01)
     *G10L 25/51*      (2013.01)
     (Continued)

(52) U.S. Cl.
     CPC ......... *G06F 17/274* (2013.01); *G06F 17/2755* (2013.01); *G10L 15/19* (2013.01); *G10L 25/51* (2013.01); *G06F 17/28* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/2795
(Continued)

(56) References Cited

U.S. PATENT DOCUMENTS 5,477,448 A * 12/1995 Golding ................ G06F 17/274
                                                 704/9
5,485,372 A * 1/1996 Golding ................ G06F 17/273
                                                 704/9
(Continued)

FOREIGN PATENT DOCUMENTS

KR    1020050039379 A    4/2005
KR    1020090015604 A    2/2009
(Continued)

OTHER PUBLICATIONS

International Search Report for PCT/KR2013/005402 dated Oct. 1, 2013.

*Primary Examiner* — Lamont Spooner
(74) *Attorney, Agent, or Firm* — Hauptman Ham, LLP

(57) ABSTRACT

An apparatus for detecting grammatical errors includes a sentence analyzer to break up a sentence into units of morphemes, tag the morphemes with parts of speech, and analyze a syntactic structure of the sentence based on the tagged parts of speech; a first error detector to generate part-of-speech sequences using n-grams of the tagged parts of speech, and detect first grammatical errors by analyzing the generated part-of-speech sequences based on grammatical rules; a second error detector to generate morpheme
(Continued)

sequences by binding the morphemes in a preset window (n-window) size, and detect second grammatical errors according to frequencies of appearance of morpheme sequences identical to the generated morpheme sequences by searching examples from an example-based index database (DB); and an integrated error detector to determine final grammatical errors in the sentence by combining the detected first grammatical errors and the detected second grammatical errors.

18 Claims, 14 Drawing Sheets

(51) Int. Cl.
  *G10L 15/19* (2013.01)
  *G06F 17/28* (2006.01)
(58) Field of Classification Search
  USPC ............................................. 704/1, 9, 10
  See application file for complete search history.

(56) References Cited

U.S. PATENT DOCUMENTS

| | | | | |
|---|---|---|---|---|
| 5,510,981 | A * | 4/1996 | Berger | G06F 17/2827 704/2 |
| 5,521,816 | A * | 5/1996 | Roche | G06F 17/273 704/9 |
| 5,535,121 | A * | 7/1996 | Roche | G06F 17/274 704/9 |
| 5,659,771 | A * | 8/1997 | Golding | G06F 17/273 715/257 |
| 5,845,306 | A * | 12/1998 | Schabes | G06F 17/271 704/10 |
| 5,956,739 | A * | 9/1999 | Golding | G06F 17/273 715/209 |
| 9,092,425 | B2 * | 7/2015 | Mirowski | G06F 17/28 |
| 2003/0233235 | A1 * | 12/2003 | Park | G06F 17/278 704/257 |
| 2005/0108001 | A1 * | 5/2005 | Aarskog | G06F 17/271 704/10 |
| 2006/0100852 | A1 * | 5/2006 | Gamon | G06F 17/271 704/9 |
| 2007/0010993 | A1 * | 1/2007 | Bachenko | G06F 17/274 704/9 |
| 2007/0185859 | A1 * | 8/2007 | Flowers | G06F 17/30864 |
| 2007/0219776 | A1 * | 9/2007 | Gamon | G06F 17/27 704/9 |
| 2007/0288458 | A1 * | 12/2007 | Kacmarcik | G06F 17/274 |
| 2008/0208567 | A1 * | 8/2008 | Brockett | G06F 17/274 704/9 |
| 2009/0265160 | A1 * | 10/2009 | Williams | G06F 17/27 704/9 |
| 2010/0036654 | A1 * | 2/2010 | Futagi | G06F 17/277 704/9 |
| 2010/0235313 | A1 * | 9/2010 | Rea | G06F 17/30265 706/52 |
| 2010/0318355 | A1 * | 12/2010 | Li | G10L 15/063 704/244 |
| 2010/0332217 | A1 * | 12/2010 | Wintner | G06F 17/2785 704/9 |
| 2015/0161096 | A1 * | 6/2015 | Kim | G06F 17/274 704/9 |

FOREIGN PATENT DOCUMENTS

| | | |
|---|---|---|
| KR | 1020100000047 A | 1/2010 |
| KR | 1020100072384 A | 1/2010 |
| KR | 1020120041567 A | 5/2012 |

* cited by examiner

FIG. 4

| Item | Rules | Example |
|---|---|---|
| Spelling Error | "impartant" -> "important"<br>"becoase" -> "because"<br>"goed" -> "went" | |
| Error In Spacing Between Words | "my" "self" -> "myself" | |
| Form Of Article | "an" "ufo" -> "a" $2 | |
| Duplication Of Article | DT DT -> ( $1 | $2 ) | the my heart |
| Inconsistency In Number | a NP[ NNS ] -> $1 $2[ NN ]<br>each NP[ NNS ] -> $1 $2[ NN ] | a children<br>each countries |
| Mixed Use Of Part Of Speech | PRP MD NN -> $0 | I can memory |
| Error In Form Of Verb | remember VB -> $1 ( VBG | to VB ) | remember go |
| Wrong Consecutive Words | do NP[ mistake ] -> make $2<br>give PRP NP[ damage ] -> cause $2 $3<br>thick coffee -> strong $2 | |
| Wrong Word Order | turn off PRP -> $1 $3 $2 | turn off them |
| Omission Of Preposition | go NP[ +place ] -> $1 to $2<br>listen NP -> $1 to $2 | go the library<br>listen music |
| Error In Form Of Comparative | more JJR -> $2 | more better |
| Unnecessary Determiner | my something -> $2 of mine | |
| Unnecessary Preposition | discuss about -> $1<br>enter into NP[ +place ] -> $1 $3 | |

FIG. 12

| Processing Target | Processing-Target Data Or Processing Result |
|---|---|
| Input Sentence | \<s\> South Korea is a democratic republic \</s\><br>\<s\> Today ate meals \</s\> |
| Part-Of-Speech Tagging | \<s\> South Korea / pron + is / v + a democratic / a + republic / n \</s\><br>\<s\> Today / n + ate / v + meals / n \</s\> |
| Part-Of-Speech Sequence | \<s\> pron + v + a + n \</s\><br>\<s\> n + v + n \</s\> |

METHOD OF DETECTING GRAMMATICAL ERROR, ERROR DETECTING APPARATUS FOR THE METHOD, AND COMPUTER-READABLE RECORDING MEDIUM STORING THE METHOD

CROSS-REFERENCE TO RELATED APPLICATION

The present application is a continuation of International Application No. PCT/KR2013/005402 filed on Jun. 19, 2013, which is based on, and claims priority from Korean Patent Application No. 10-2012-0087788 filed in the Korean Intellectual Property Office on Aug. 10, 2012. The disclosures of the above-listed application are hereby incorporated by reference herein in their entirety.

TECHNICAL FIELD

The present disclosure relates to an apparatus and method for detecting a grammatical error by sequentially using an error detecting scheme of detecting grammatical English composition errors in a written sentence.

BACKGROUND

The statements in this section merely provide background information related to the present disclosure and do not constitute prior art.

Recently, in college entrance examinations and domestic large corporations, grade-oriented evaluation is changing to evaluate actual English proficiency in speaking/writing. In an English ability test, a writing evaluation system is being also introduced to evaluate a writing ability.

The inventor(s) has noted that an existing writing evaluation system grammatically analyzes an already-written sentence and evaluates whether or not the written sentence is grammatically correct through error detection. At this time, the process of analyzing the written sentence involves analyzing morphemes of the sentence and tagging the morphemes with parts of speech. The inventor(s), however, has noted that an existing morpheme analyzing and part-of-speech tagging device depends upon only part-of-speech sequence information without considering vocabulary, parts of speech, meanings, and contextual co-occurrence relations of surrounding words. The inventor(s) has experienced that the accuracy of the device is significantly degraded.

The inventor(s) has experienced that since there are many interdependent relationships in context of a natural language, syntax analysis with unilaterally defined grammar is limited. In this regard, the inventor(s) has experienced that there is a need of a writing evaluation scheme for reducing as many errors in error detection as possible and correctly correcting a detected error by using a mainly used pattern without continuously generating complex rules.

SUMMARY

In accordance with some embodiments, an apparatus for detecting grammatical errors comprises a sentence analyzer, a first error detector, a second error detector, and an integrated error detector. The sentence analyzer is configured to break up a sentence into units of morphemes, tag the morphemes with parts of speech, and analyze a syntactic structure of the sentence based on the tagged parts of speech. The first error detector is configured to generate part-of-speech sequences using n-grams of the tagged parts of speech, and detect first grammatical errors by analyzing the generated part-of-speech sequences based on grammatical rules. The second error detector is configured to generate morpheme sequences by binding the morphemes in a preset window (n-window) size, and detect second grammatical errors according to frequencies of appearance of morpheme sequences identical to the generated morpheme sequences by searching examples from an example-based index database (DB). And the integrated error detector is configured to determine final grammatical errors in the sentence by combining the detected first grammatical errors and the detected second grammatical errors.

In accordance with some embodiments, an apparatus for detecting grammatical errors performs a method of breaking up a sentence into units of morphemes; tagging the morphemes with parts of speech; a first error detecting step of generating part-of-speech sequences in units of predetermined windows using n-grams of the tagged parts of speech, and detecting first grammatical errors in the sentence from the part-of-speech sequences based on grammatical rules; a second error detecting step of generating morpheme sequences by binding the morphemes in a preset window size in one or more directions of a forward direction and a backward direction, and detecting second grammatical errors in the sentence according to frequencies of appearance of morpheme sequences identical to the generated morpheme sequences by searching examples from an example-based index database (DB); and determining final grammatical errors in the sentence by combining the detected first grammatical errors and the detected second grammatical errors.

In accordance with some embodiments, a non-transitory computer-readable recording medium storing a program for causing an apparatus for detecting grammatical errors to execute a method of detecting grammatical errors, the method comprising: breaking up a sentence into units of morphemes; tagging the morphemes with parts of speech; detecting first grammatical errors, the detecting of the first grammatical errors comprising generating part-of-speech sequences in units of predetermined windows using n-grams of the tagged parts of speech, and detecting first grammatical errors in the sentence from the part-of-speech sequences based on grammatical rules; detecting second grammatical errors, the detecting of the second grammatical errors comprising generating morpheme sequences by binding the morphemes in a preset window size in one or more directions of a forward direction and a backward direction, and detecting second grammatical errors in the sentence according to frequencies of appearance of morpheme sequences identical to the generated morpheme sequences by searching examples from an example-based index database (DB); and determining final grammatical errors in the sentence by combining the detected first grammatical errors and the detected second grammatical errors.

BRIEF DESCRIPTION OF DRAWINGS

FIG. 4 is a table of examples of regular grammar

FIG. 12 is an example table of a process of generating a part-of-speech sequence through a first error detecting method of FIG. 11.

DETAILED DESCRIPTION

Figure 1:
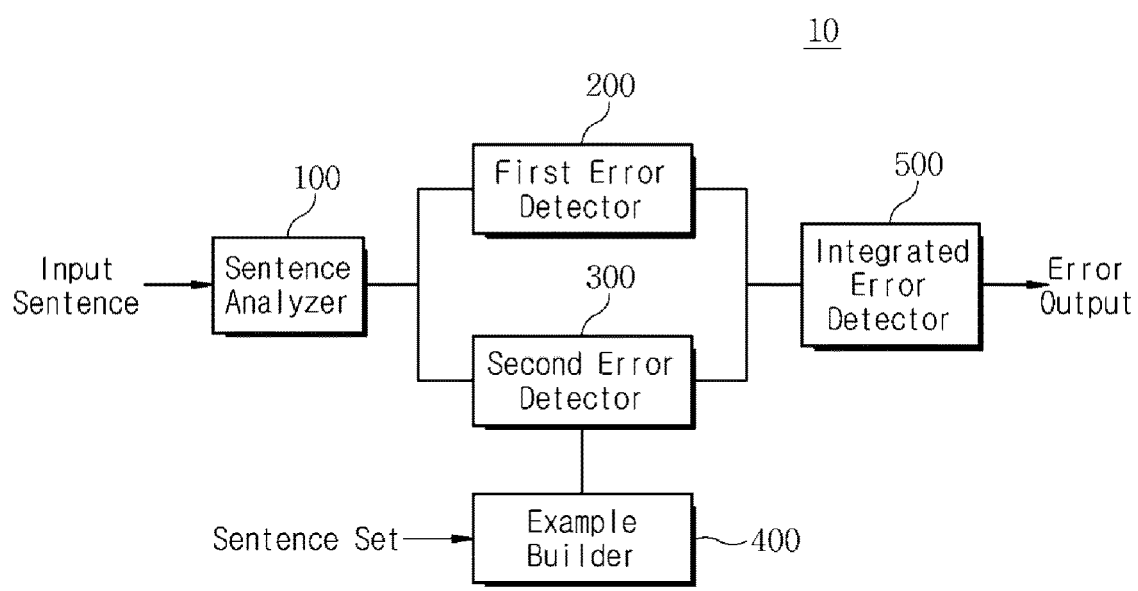
FIG. 1 is a diagram of a constitution of an error detecting apparatus for detecting a grammatical error according to at least one embodiment of the present disclosure.

Hereinafter, exemplary embodiments of the present disclosure will be described in detail with reference to the accompanying drawings. In the following description and the accompanying drawings, when detailed descriptions on the known art related to the present disclosure are determined to unnecessarily obscure the gist of the present disclosure, the detailed descriptions will be omitted. Throughout the drawings, like elements are referred to by like numerals within the limits of the possible.

Some embodiments of the present disclosure are directed to providing a grammatical error detecting method of detecting final errors in a written input sentence by sequentially using a scheme for breaking up the written input sentence into units of morphemes to tag the morphemes with parts of speech, detecting simple grammatical English composition errors in a sequence of the respective tagged parts of speech and simultaneously detecting errors in syntax analysis by parsing the written input sentence based on rules defined by connection relationships between adjacent parts of speech, and a scheme for generating a morpheme sequence bound in an arbitrary window size from the broken-up morphemes, searching an example-based database (DB) for each morpheme sequence to analyze a frequency of which each morpheme and a morpheme sequence for the morpheme are arranged together, and then detecting errors in each morpheme based on examples, an error detecting apparatus for the method, and a non-transitory computer-readable recording medium storing the method.

The terms or words used in the present specification and claims described below are not to be construed as common or dictionary meanings but are to be construed as meanings and concepts in accordance with the technical spirit of the present disclosure based on a principle that the inventor can define terms appropriately for the best explanation of his or her own disclosure. Embodiments described in the present specification and configurations shown in the drawings are merely exemplary embodiments or the present disclosure and do not represent all the spirit of the present disclosure. Thus, it is to be understood that there can be various equivalents and modifications at the filing data of the present disclosure.

FIG. 1 is a diagram of a constitution of an error detecting apparatus for detecting a grammatical error according to at least one embodiment of the present disclosure.

Referring to FIG. 1, an error detecting apparatus 10 for detecting a grammatical error according to the present disclosure includes a sentence analyzer 100, a first error detector 200, a second error detector 300, an example builder 400, and an integrated error detector 500. Other components of the error detecting apparatus 10, such as the sentence analyzer 100, the first error detector 200, the second error detector 300, the example builder 400, and the integrated error detector 500 are implemented by one or more processors and/or application-specific integrated circuits (ASICs). The error detecting apparatus 10 includes one or more input and output components (not shown in FIG. 1), such as a display, a printer, network adapter, a keyboard, a mouse, a transmitter/receiver of a cell phone, a touchpad and so on.

The sentence analyzer 100 receives written input sentences as data. At this time, the sentence analyzer 100 breaks up the inputted writing (hereinafter, referred to as "input sentences") into units of morphemes, and tags the broken-up morphemes with the corresponding parts of speech. Also, the sentence analyzer 100 analyzes the syntactic structure of each sentence based on the tagged parts of speech, and extracts syntax trees as results of the analysis. During the parsing, the sentence analyzer 100 transfers the sentences tagged with the parts of speech to the first error detector 200 and the second error detector 300 so as to reduce as many errors in syntax analysis as possible.

The first error detector 200 generates part-of-speech sequences using n-grams of the sentences received from the sentence analyzer 100, and analyzes the generated parts of speech based on simple grammatical rules and also based on grammatical rules defined according to connection relationships between adjacent parts of speech at the same time, thereby detecting errors in syntax analysis caused by the connection relationships between adjacent parts of speech as well as simple errors in English composition and transferring the detected errors to the integrated error detector 500. In particular, the first error detector 200 generates part-of-speech sequences using n-grams of the tagged parts of speech, and analyzes the generated part-of-speech sequences based on grammatical rules, thereby detecting the errors.

The second error detector 300 detects errors in the input sentences in an example-based manner using an index database (DB) built by the example builder 400, and transfers the detected errors to the integrated error detector 500. Also, the second error detector 300 may perform an error correcting function by suggesting correctives to the detected errors.

In order to detect errors in the input sentences based on example-based statistical information, the second error detector 300 does not search the input sentences in their entirety but uses an N-gram search scheme of binding sections in units of arbitrary (preset or predetermined, hereinafter referred to as "arbitrary" solely for convenience of description) windows and comparing and searching for statistical information in units of sections. In particular, the second error detector 300 generates the part-of-speech sequences by binding the broken-up morphemes in an arbitrary window size, and detects errors according to the frequencies of appearance of part-of-speech sequences identical to the generated part-of-speech sequences by searching the example-based index DB.

The example builder 400 collects example text from a plurality of sentences exposed through language transmission media and builds the high-capacity index DB to be used in error detection.

The integrated error detector 500 combines the errors detected by the first error detector 200 detecting sentence errors based on rules and the errors detected by the second error detector 300 detecting sentence errors based on examples to finally determine whether or not there are errors, and outputs results of the determination. At this time, the integrated error detector 500 may effectively detect errors in the sentences by using a scheme employing the first error detector 200 and a scheme employing the second error detector 300 at the same time. Alternatively, the integrated error detector 500 may perform error detection through the first error detector 200 and then detect errors in the sentences through the second error detector 300, thereby clearly detecting final errors in the sentences. In particular, the integrated error detector 500 determines the errors detected by the first error detector 200 prior to the errors detected by the second error detector 300 as the final errors in the sentences.

According to the present disclosure, the error detecting apparatus 10 for sentence evaluation may perform reliable sentence evaluation through two types of sentence error detection.

Figure 2:
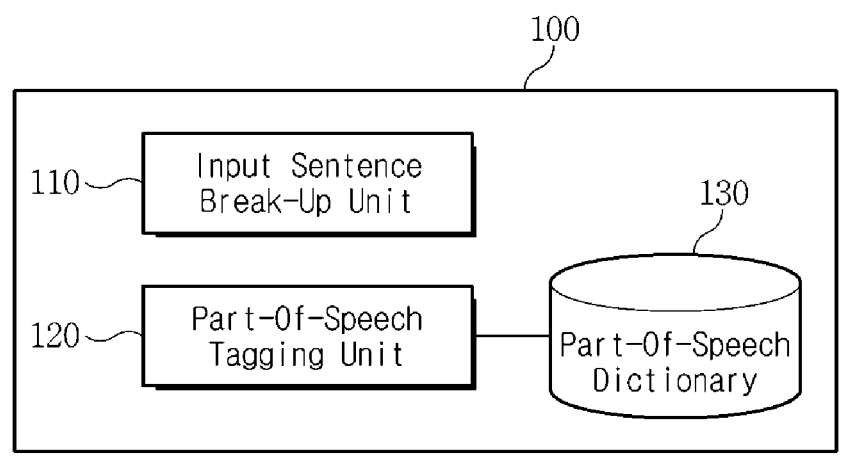
FIG. 2 is a diagram showing a constitution of a sentence analyzer according to at least one embodiment of the present disclosure.

FIG. 2 is a diagram of a constitution of a sentence analyzer according to at least one embodiment of the present disclosure.

As an exemplary embodiment of the present disclosure, a constitution for detecting a sentence error separately includes the first and second error detectors 200 and 300 and the sentence analyzer 100. However, the constitution is not limited to the example, and the first error detector 200 is included in the sentence analyzer 100 and implemented as one device, or the second error detector 300 may be included in the sentence analyzer 100 and implemented as one device.

Referring to FIG. 2, the sentence analyzer 100 includes an input sentence break-up unit 110 and a part-of-speech tagging unit 120 as components for receiving the written input sentences as data and evaluating the input sentences. The sentence analyzer 100 also includes a part-of-speech dictionary 130. Other components of the sentence analyzer 100, such as the input sentence break-up unit 110, the part-of-speech tagging unit 120 and the part-of-speech dictionary 130 are implemented by one or more processors and/or application-specific integrated circuits (ASICs). In particular, the sentence analyzer 100 breaks up the input sentences in units of morphemes, tags the broken-up morphemes with parts of speech, and analyzes the syntactic structures of the sentences based on the tagged parts of speech.

The input sentence break-up unit 110 breaks up the input sentences in units of morphemes. Here, sentence break-up denotes an operation of breaking up several sentences into units of sentences based on punctuation marks, such as a period, a question mark, and an exclamation mark. Also, according to morpheme break-up, postpositions are not arranged next to a word due to linguistic characteristics, and thus a morpheme which is the smallest unit of meaning may be a word.

The part-of-speech tagging unit 120 tags the morphemes broken up by the input sentence break-up unit 110 with the corresponding parts of speech. Here, part-of-speech tagging is performed with reference to the part-of-speech dictionary 130. For example, the types of parts of speech include noun, verb, preposition, adjective, adverb, article, interjection, and so on. When "I would like to live in the city." is inputted as an example of an input sentence, the input sentence break-up unit 110 breaks up the input sentence into "I," "would," "like," "to," "live," "in," "the," "city," and ".," and the part-of-speech tagging unit 120 tags the broken-up morphemes with noun (I), verb (would), verb (like), preposition (to), verb (live), preposition (in), article (the), noun (city), etc. in sequence.

To effectively detect sentence errors, the sentence analyzer 100 according to the present disclosure further includes a syntax analysis unit (not shown). In particular, the syntax analysis unit analyzes the syntactic structure of each sentence based on the parts of speech tagged by the part-of-speech tagging unit 120, and extracts a syntax tree as a result of the analysis. In general, syntax analysis of a sentence is referred to as parsing, and a program that outputs a syntax tree so as to find whether a character sequence can be generated according to grammar is referred to as a parser. During parsing, in order to reduce as many errors in syntax analysis as possible, the syntax analysis unit transfers a sentence tagged with parts of speech to the first error detector 200 or the second error detector 300, receives information on detected errors from the integrated error detector 500, and causes a syntax tree to reflect the error information.

Figure 3:
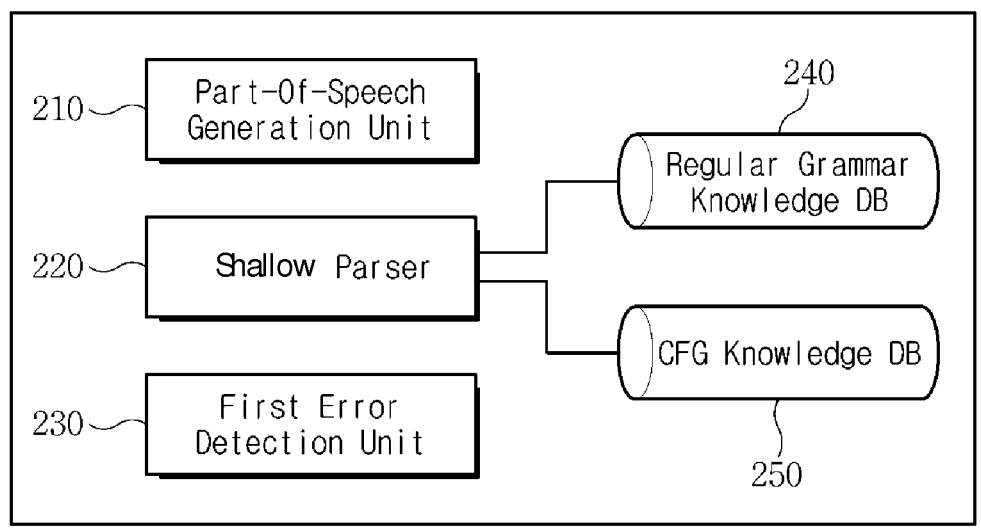
FIG. 3 is a diagram of a constitution of a first error detector according to at least one embodiment of the present disclosure.

FIG. 3 is a diagram of a constitution of a first error detector according to at least one embodiment of the present disclosure, and FIG. 4 is a table of examples of regular grammar.

Referring to FIG. 3, the first error detector 200 includes a part-of-speech sequence generation unit 210, a shallow parser 220, a first error detection unit 230, a regular grammar knowledge DB 240, a context-free grammar (CFG) knowledge DB 250, and so on. Other components of the first error detector 200, such as the part-of-speech sequence generation unit 210, the shallow parser 220, the first error detection unit 230, the regular grammar knowledge DB 240, the context-free grammar (CFG) knowledge DB 250 are implemented by one or more processors and/or application-specific integrated circuits (ASICs).

The part-of-speech sequence generation unit 210 generates part-of-speech sequences of the respective parts of speech tagged by the part-of-speech tagging unit 120 using n-grams for binding the parts of speech in an arbitrary window size.

For example, from the input sentence "I went to go to school," "I/noun," "went/verb," "to/preposition," "go/verb," "to/preposition," and "school/noun" may be extracted, and the part-of-speech sequence generation unit 210 may generate "I went to," "went to go," "go to school," "to school (null)," "school (null) (null)," etc. as part-of-speech sequences of the respective parts of speech using trigrams.

The part-of-speech sequence generation unit 210 sets a window size in advance, generate a part-of-speech sequence corresponding to the set window size, and use the part-of-speech sequence for error detection. For detailed detection, it is possible to generate and analyze each part-of-speech sequence by changing the window size to a bigram and a trigram.

The shallow parser 220 parses the structure of a part-of-speech sequence generated by the part-of-speech sequence generation unit 210 in consideration of connection relationships between adjacent parts of speech based on regular grammar rules and CFG rules. Here, the CFG rules, in which general grammar is defined, are generally referred to as English grammar, and include rules about spelling, articles, tenses, and so on.

As examples of the rules, "s" is added to a present tense verb next to a third person singular subject, and "a" or "an" comes in front of a singular countable noun while "an" comes in front of a noun beginning with a vowel.

Such CFG rules are stored in the CFG knowledge DB 250, and provided to be used when the shallow parser 220 performs parsing.

In the regular grammar rules, exceptions for which general grammar, that is, the CFG, is not defined as rules are defined as rules. The regular grammar rules may be additionally defined according to connection relationships or the degrees of closeness between adjacent parts of speech. Specifically, as shown in the table of FIG. 4, it is possible to define rules about spelling errors, errors in spacing between words, forms of articles, duplication of articles, inconsistency in number, mixed use of a part of speech, errors in the forms of verbs, wrong consecutive words, wrong word orders, omissions of prepositions, errors in the forms of comparatives, unnecessary determiners, unnecessary prepositions, and so on.

For example, it is defined in CFG that the article "a" comes in front of a word beginning with a consonant while the article "an" comes in front of a word beginning with a silent consonant. On the other hand, the article "an" instead of the article "a" comes in front of the consonant noun "hoest" according to regular grammar. In other words, additional rules about nouns corresponding to exceptions of CFG are regular grammar.

As another example of the regular grammar rules, when the typing error "beggining" is detected, it may be analyzed as a typing error of "beginning," and the corrective "beginning" may be suggested upon the error detection.

Such regular grammar rules are stored in the regular grammar knowledge DB 240, and provided to be used when the shallow parser 220 performs parsing.

Therefore, the shallow parser 220 directly analyzes simple grammatical errors using the previously stored CFG rules, and calculates the degrees of closeness of the part-of-speech sequences according to connection relationships between adjacent parts of speech using the regular grammar rules. When the degree of closeness of each part-of-speech sequence is high, a derivation tree including the part-of-speech sequence as a noun phrase, a compound word, an object phrase, a subordinate clause, etc. may be generated, and when the degree of closeness is low, a derivation tree including words constituting each part-of-speech sequence not as a phrase but as independent words may be generated.

A determination of whether the degree of closeness is high or low may be made according to a reference value set for the determination. Alternatively, the degrees of closeness may be calculated from several derivation trees that can be derived from one part-of-speech sequence, and the determination may be made with the highest and lowest degrees of closeness among the calculated degrees of closeness. In this case, a derivation tree having the highest degree of closeness may be selected to detect errors.

In addition, the shallow parser 220 performs bottom-up chart parsing of shifting from the right of the tagged parts of speech to the left. The bottom-up chart parsing is not for general syntax analysis, and thus is not intended to construct a sentence with all the parts of speech. In other words, when an additional node is not newly generated, the parsing is stopped.

The first error detection unit 230 detects errors from a syntax tree analyzed by the syntax analysis unit 130 based on analysis results generated by the shallow parser 220. At this time, the first error detection unit 230 searches an input sentence using n-grams, which break up the input sentence into a sequence of predetermined sections, rather than in its entirety, and thus it is possible to have a higher error detection speed and also accurately perform error detection in comparison with a method of analyzing an input sentence in its entirety. In particular, the first error detector 200 generates part-of-speech sequences using n-grams of tagged parts of speech and analyzes the generated part-of-speech sequences based on grammatical rules, thereby detecting errors.

Figure 5:
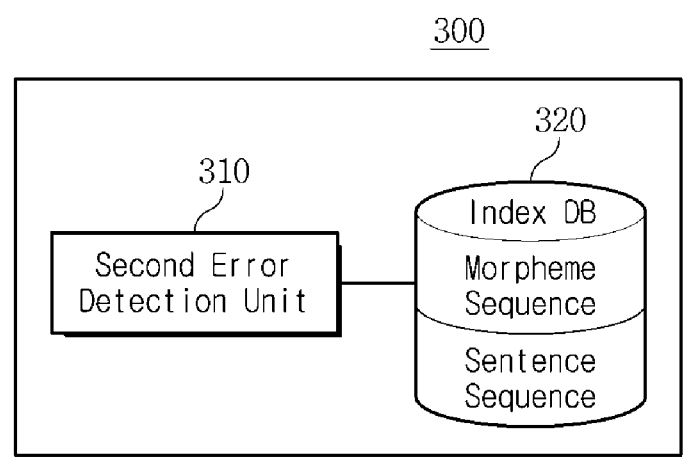
FIG. 5 is a diagram of a constitution of a second error detector according to at least one embodiment of the present disclosure.

FIG. 5 is a diagram of a constitution of a second error detector according to at least one embodiment of the present disclosure.

Referring to FIG. 5, the second error detector 300 includes a second error detection unit 310 and an index DB 320. Other components of the second error detector 300, such as the second error detection unit 310 and the index DB 320 are implemented by one or more processors and/or application-specific integrated circuits (ASICs).

The second error detection unit 310 generates morpheme sequences by binding the morphemes tagged by the part-of-speech tagging unit 120 in an arbitrary window size, searches the index DB 320 according to the generated morpheme sequences, and detects errors according to a frequency of which each morpheme and the corresponding morpheme sequence are arranged together. The second error detection unit 310 does not search an input sentence in its entirety but searches the input sentence by breaking up the input sentence into predetermined sections, and thus it is possible to have higher error detection speed and also accurately perform error detection in comparison with a method of analyzing an input sentence in its entirety.

In addition, the second error detector 300 further includes an error correction unit (not shown). In particular, the error correction unit extracts morphemes that are arranged together with the part-of-speech sequences searched for by the second error detection unit 310, in particular, extracts the morphemes in order of decreasing frequency, and suggests the extracted morphemes as correctives to detected errors. In this way, the error correction unit may suggest only morphemes in error sections as correctives using the n-gram search scheme applied as an error detecting scheme, and may also search sentences similar to a whole sentence in its entirety and simply suggest k similar sentences in order of decreasing similarity as correctives. In particular, the second error detector 300 generates morpheme sequences by binding broken-up morphemes in an arbitrary window size, and detects errors according to the frequencies of appearance of morpheme sequences identical to the generated morpheme sequences by searching an example-based index DB.

Figure 6:
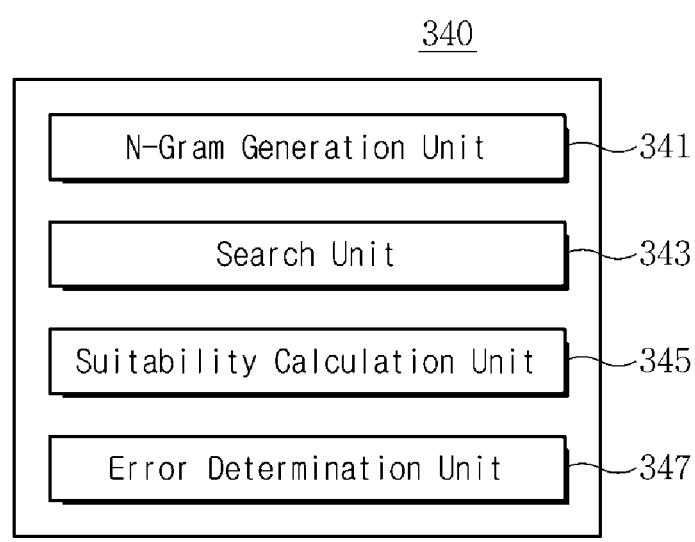
FIG. 6 is a detailed diagram of a second error detection unit of FIG. 5.
Figure 7:
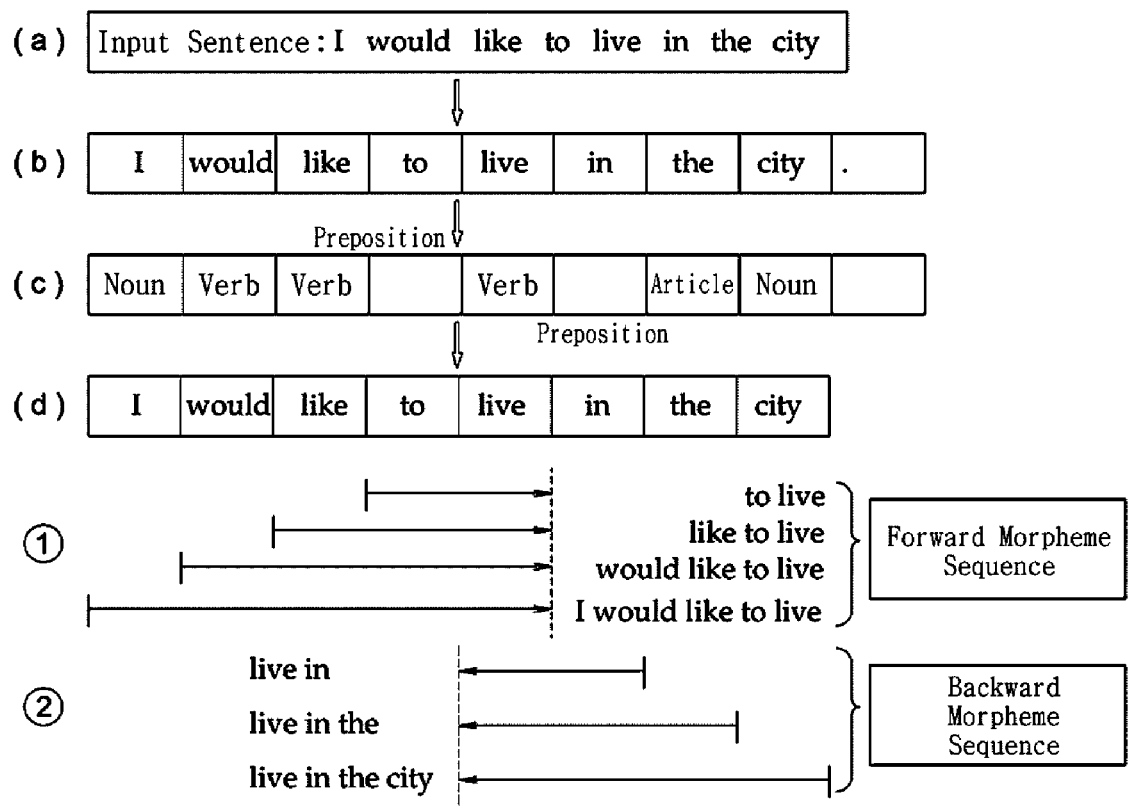
FIG. 7 is an example diagram of functions performed by respective components of FIG. 5.

FIG. 6 is a detailed diagram of a second error detection unit of FIG. 5, and FIG. 7 is an example diagram illustrating functions performed by respective components of FIG. 5.

Referring to FIG. 6, the second error detection unit 310 according to at least one embodiment of the present disclosure includes an n-gram generation unit 341, a search unit 343, a suitability calculation unit 345, and an error determination unit 347. Other components of the second error detection unit 310, such as the n-gram generation unit 341, the search unit 343, the suitability calculation unit 345, and the error determination unit 347 are implemented by one or more processors and/or application-specific integrated circuits (ASICs).

The n-gram generation unit 341 generates a part-of-speech sequence by binding morphemes in an arbitrary window size in one or more directions of a forward direction and a backward direction.

In particular, the n-gram generation unit 341 according to the present disclosure may separately generate forward morpheme sequences by binding morphemes arranged in the forward direction from respective morphemes in an arbitrary window size and backward morpheme sequences by binding morphemes arranged in the backward direction in an arbitrary window size.

For example, a forward morpheme sequence, which may be generated based on the morpheme "live" in an input sentence as shown in FIG. 7's (d)-☐ of FIG. 7, shows an example of morpheme sequences obtained by binding morphemes in a 2-window unit to a 5-window unit with respect to the morpheme "live." In other words, a morpheme sequence obtained by binding the morphemes in a 2-window unit is "to live," a morpheme sequence obtained by binding the morphemes in a 3-window unit is "like to live," and morpheme sequences subsequently obtained by increasing the window size by one are "would like to live" and "I would like to live." Therefore, it is possible to extract the frequency that "live" comes behind "to" in a morpheme sequence including the morpheme "live," or the respective frequencies that "live" comes behind "like to," "would like to," and "I would like to."

On the other hand, as shown in FIG. 7's ☐ of (d), it is possible to generate morpheme sequences by binding morphemes (in, the, city) arranged in the backward direction from the morpheme "live" in an arbitrary window size. A morpheme sequence obtained by binding the morphemes in a 2-window unit may be generated as "live in," a morpheme sequence obtained by binding the morphemes in a 3-window unit may be generated as "live in the," and a morpheme sequence obtained by binding the morphemes in a 4-window unit may be generated as "live in the city."

At this time, the n-gram generation unit 341 has set a window size in advance, and generates a morpheme sequence corresponding to the set window size and uses the generated morpheme sequence for error detection. For detailed detection, respective morpheme sequences are generated while changing the window size to a bigram, a trigram, etc., and analyze the generated morpheme sequences. However, in this case, the capacity of morpheme sequences stored in the index DB 320 remarkably increases, and analysis is complicated. Therefore, morpheme sequences in only one window size are generated and analyzed.

The search unit 343 searches whether morpheme sequences identical to the morpheme sequences generated by the n-gram generation unit 341 are in the example-based index DB 320 built with many pieces of example text, according to the respective morphemes included in input sentences.

The suitability calculation unit 345 extracts the frequencies of appearance of morpheme sequences identical to the generated morpheme sequences, and calculates suitability based on the extracted frequencies. Suitability is a score indicating the frequency of each morpheme in morpheme sequences. When there are both forward and backward morpheme sequences generated by the n-gram generation unit 341, the suitability calculation unit 345 may separately calculate suitability of one morpheme for morpheme sequences in one or more directions of the forward direction and the backward direction, and calculate an integrated suitability by integrating the respective scores of suitability.

In addition, when calculating suitability for a forward morpheme sequence and a backward morpheme sequence, the suitability calculation unit 345 applies different weights according to the frequencies of each morpheme in morpheme sequences. For example, when there are the backward morpheme sequence "live in" obtained by binding morphemes in a 2-window unit, the backward morpheme sequence "live in the" obtained by binding morphemes in a 3-window unit, and the backward morpheme sequence "live in the city" obtained by binding morphemes in a 4-window unit, higher weights are given to morpheme sequences corresponding to larger numbers of windows, so that suitability may be determined with reference to more information.

The error determination unit 347 detects an error section by determining whether there is a section in which a suitability score is smaller than a threshold or is drastically reduced by a predetermined value or more (i.e., a suitability score is changed larger than a predetermined value). At this time, the error determination unit 347 separately constructs the graphs of suitability in the forward direction, suitability in the backward direction, and integrated suitability.

Figure 8:
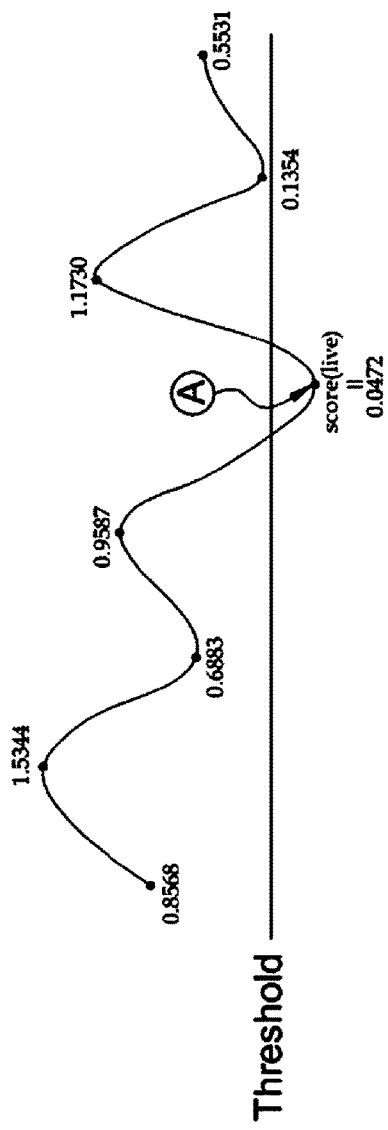
FIG. 8 is an example diagram of result values of the second error detection unit of FIG. 5.

FIG. 8 is an example diagram of result values of the second error detection unit of FIG. 5.

Referring to the example shown in FIG. 8, FIG. 8's (a) is an input sentence, and FIG. 8's (b) shows suitability of the input sentence calculated according to respective morphemes.

score_f(Wm) shown in FIG. 8's (b) is forward suitability indicating a frequency of which each morpheme may be arranged with forward morpheme sequences, score_b(Wm) is backward suitability indicating a frequency of which each morpheme may be arranged with backward morpheme sequences, and score(Wm) is integrated suitability obtained by averaging forward suitability and backward suitability. "Wm" indicates a weight of morpheme in morpheme sequences. In FIG. 8's (b), each score of score_f(Wm) is a suitability score indicating frequency of binding each morpheme in morpheme sequences (i.e., an input sentence od FIG. 8's (a)) with first morpheme "I" in the input sentence FIG. 8's (a). And, each score of score_f(Wm) is calculated in forward direction based on the first morpheme "I" in the input sentence of FIG. 8's (a). In FIG. 8's (b), each score of score_b(Wm) is a suitability score indicating frequency of binding each morpheme in morpheme sequences (i.e., an input sentence od FIG. 8's (a)) with the last morpheme "city" in the input sentence FIG. 8's (a). And, each score of score_b(Wm) is calculated in backward direction based on the last morpheme "city" in the input sentence of FIG. 8's (a).

FIG. 8's (c) shows a graph derived from the integrated suitability shown in FIG. 8's (b). From the graph, it is possible to know that there is an error, such as omission of a word, around A at which the graph is lower than a threshold, that is, around the morpheme "live."

Figure 9:
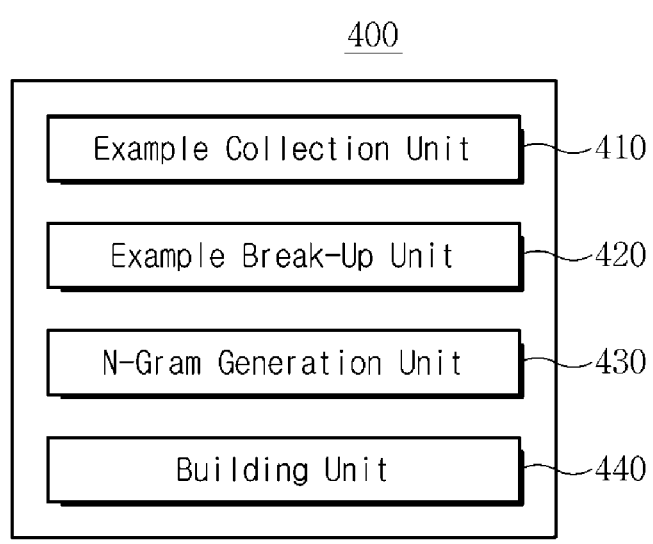
FIG. 9 is a diagram of a constitution of an example builder according to at least one embodiment of the present disclosure.

FIG. 9 is a diagram of a constitution of an example builder according to at least one embodiment of the present disclosure.

Referring to FIG. 9, the example builder 400 includes an example collection unit 410, an example break-up unit 420, an n-gram generation unit 430, and a building unit 440. Other components of the example builder 400, such as the example collection unit 410, the example break-up unit 420, the n-gram generation unit 430, and the building unit 440 are implemented by one or more processors and/or application-specific integrated circuits (ASICs).

The example collection unit 410 collects example text from enormous data sets exposed through language transmission media, such as the Internet, news, and newspaper articles. At this time, it is assumed that the example text includes sentences used in real life, sentences including various styles of writing, and so on. News and newspaper articles are used because there are a smaller number of sentence errors than in other media.

The example collection unit 410 has input keywords desired to be collected in advance, and automatically collect example text in which the input keywords are used while monitoring sentence sets exposed through the language transmission media.

The example break-up unit 420 breaks up the example text collected by the example collection unit 410 in units of morphemes. Here, sentence break-up denotes an operation of breaking up example text having several sentences into units of sentences based on punctuation marks, such as a period, a question mark, and an exclamation mark. Also, morpheme break-up denotes an operation of breaking up the respective pieces of example text broken up into units of sentences into units of morphemes.

The n-gram generation unit 430 generates morpheme sequences by binding the morphemes broken up by the example break-up unit 420 in an arbitrary window size. At this time, the morpheme sequences are generated by binding the morphemes in an arbitrary window size in one or more directions of the forward direction and the backward direction from the respective morphemes. For example, from the example text "I want to go to school," using a 3-window unit, the morpheme sequence "I want to" may be generated based on the morpheme "I," the morpheme sequences "want to go" and "(null) I want" may be generated based on the morpheme "want," and the morpheme sequences "to go to" and "I want to" may be generated based on the morpheme "to." This is intended to store the example text in its entirety and also in units of morpheme sequences when the index DB 320 is built.

The building unit 440 matches the morpheme sequences generated by the n-gram generation unit 430 with the corresponding example text, and stores the morpheme sequences and the corresponding example text in the index DB 320.

Figure 10:
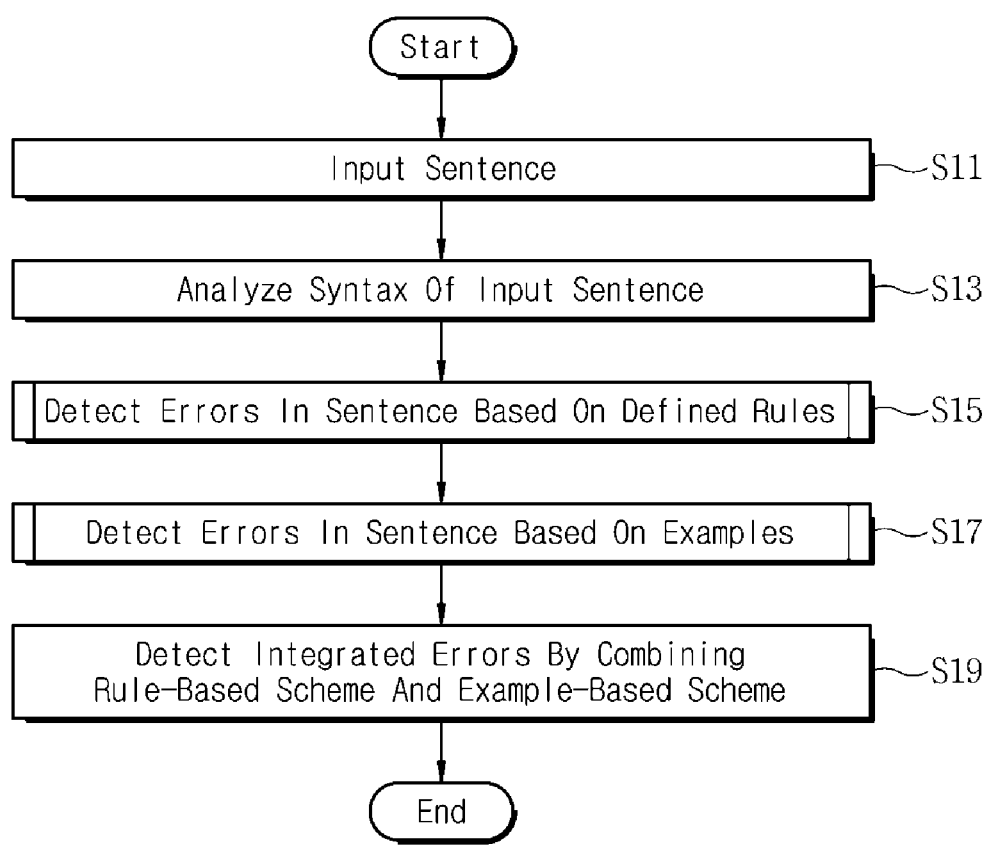
FIG. 10 is a flowchart of an operation of the error detecting apparatus according to at least one embodiment of the present disclosure.

FIG. 10 is a flowchart illustrating operation of an error detecting apparatus according to at least one embodiment of the present disclosure.

Referring to FIG. 10, in step S11, the error detecting apparatus 10 receives an input sentence, and breaks up the input sentence in units of morphemes. At this time, the error detecting apparatus 10 tags the morphemes with the corresponding parts of speech based on the part-of-speech dictionary 130. Then, in step S13, the error detecting apparatus 10 performs syntax analysis of the broken-up sentence based on the tagged parts of speech, and extracts a syntax tree as a result of the analysis. During parsing, the error detecting apparatus 10 transfers the sentence tagged with the parts of speech to the first error detector 200 or the second error detector 300 so as to reduce as many errors in syntax analysis as possible, receives information on detected errors from the integrated error detector 500, and causes the syntax tree to reflect the error information.

In step S15, the error detecting apparatus 10 generates part-of-speech sequences of the sentence received from the sentence analyzer 100 using n-grams, and simultaneously analyzes the generated part-of-speech sequences based on simple grammatical rules and also based on grammatical rules defined according to connection relationships between adjacent parts of speech, thereby detecting errors in syntax analysis caused by the connection relationships between adjacent parts of speech as well as simple errors in English composition. In other words, to determine whether there is an error in the extracted syntax tree, the error detecting apparatus 10 generates part-of-speech sequences for each part of speech using the shallow parser 220, and detects errors in units of generated part-of-speech sequences. Here, the error detecting apparatus 10 detects errors based on defined rules.

In step S17, the error detecting apparatus 10 detects errors in the input sentence input from the sentence analyzer 100 using the example-based index DB 320 built by the example builder 400.

In step S19, the error detecting apparatus 10 combines errors detected by the first error detector 200 detecting sentence errors based on the defined rules and detected by the second error detector 300 detecting sentence errors based on examples, thereby detecting final errors. Also, the error detecting apparatus 10 determines errors detected by the first error detector 200 prior to errors detected by the second error detector 300 as the final errors in the sentence.

In this way, the error detecting apparatus 10 may simultaneously examine the written sentence and rapidly detect errors in the sentence. Alternatively, the error detecting apparatus 10 may perform error detection through the first error detector 200 and then detect errors in the sentence through the second error detector 300, thereby clearly detecting errors in the sentence.

Figure 11:
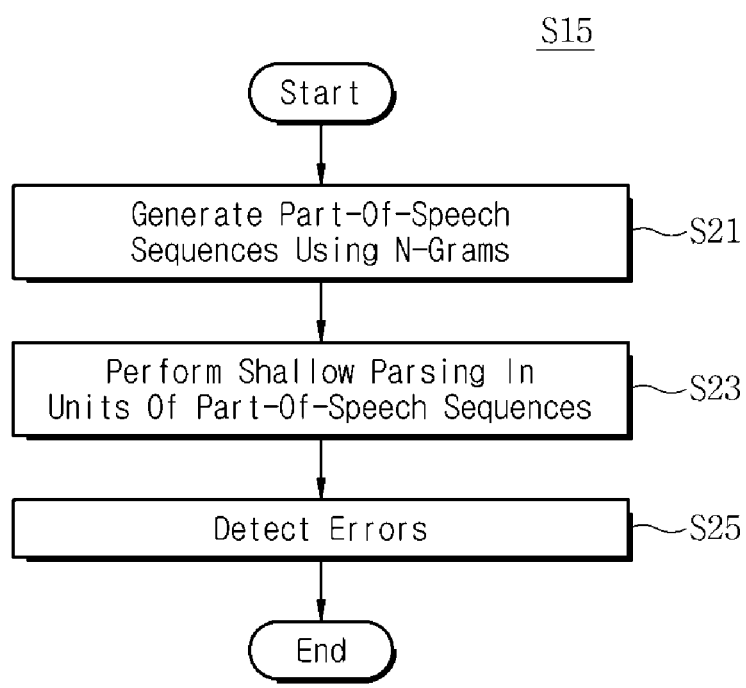
FIG. 11 is a flowchart of an operation of the first error detector according to at least one embodiment of the present disclosure.

FIG. 11 is a flowchart illustrating operation of a first error detector according to at least one embodiment of the present disclosure, and FIG. 12 is an example table illustrating a process of generating a part-of-speech sequence through a first error detecting method of FIG. 11.

Referring to FIG. 11, the first error detector 200 is implemented separately from the sentence analyzer 100 in an error detecting process. Specifically, the error detecting step (S15) in which the first error detector 200 is used includes step S21 in which the first error detector 200 generates part-of-speech sequences for each part of speech tagged through a part-of-speech tagging process in units of predetermined windows. Here, a predetermined window denotes grouping of two, three or more (n) adjacent parts of speech. A scheme of grouping every two adjacent parts of speech is a bigram, and a scheme of grouping every three adjacent parts of speech is a trigram. In other words, the first error detector 200 generates part-of-speech sequences according to previously set units using n-grams (a bigram, a trigram, etc.).

In step S23, the first error detector 200 performs shallow parsing in units of parts of speech. In the shallow parsing, a syntactic structure is analyzed in consideration of the degrees of closeness between adjacent parts of speech based on previously stored CFG rules and regular grammar rules.

Specifically, simple grammatical errors are directly analyzed using the knowledge of the CFG rules, and at the same time, the degrees of closeness of the part-of-speech sequences according to connection relationships between adjacent parts of speech are calculated using the previously stored regular grammar rules. When the degree of closeness of each part-of-speech sequence is high, a derivation tree including the part-of-speech sequence as a noun phrase, a compound word, an object phrase, a subordinate clause, etc. may be generated, and when the degree of closeness is low, a derivation tree including words constituting each part-of-speech sequence not as a phrase but as independent words may be generated.

Subsequently, in step S25, the first error detector 200 detects errors in the syntax tree extracted through syntax analysis based on results of the analysis.

Figure 13:
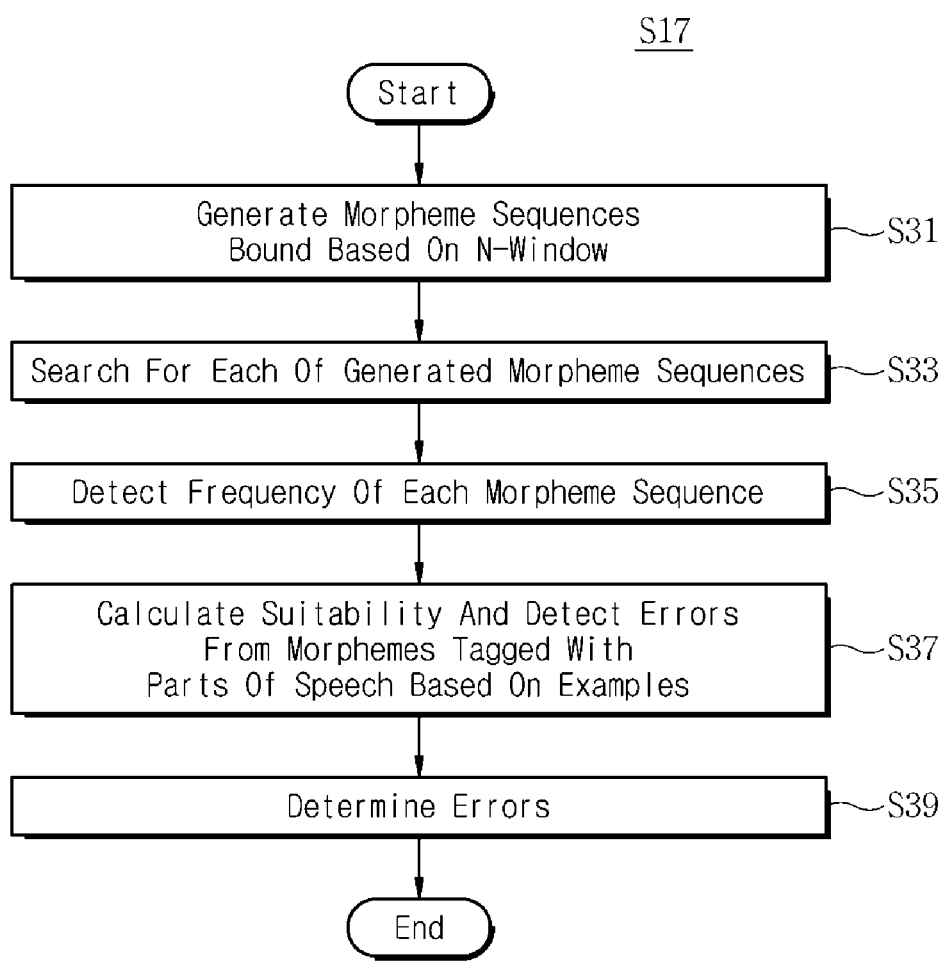
FIG. 13 is a flowchart of an operation of the second error detector according to at least one embodiment of the present disclosure.

FIG. 13 is a flowchart illustrating operation of a second error detector according to at least one embodiment of the present disclosure.

Referring to FIG. 13, specifically, the error detecting step (S17) employing the second error detector 300 includes step S31 in which the second error detector 300 generates a morpheme sequence by binding morphemes of an input sentence sequences in an arbitrary window size. As described above, it is possible to separately generate unidirectional or multi-directional morpheme sequences among forward morpheme sequences obtained by binding morphemes in the forward direction from the respective morphemes and backward morpheme sequences obtained by binding the morphemes in the backward direction from the respective morphemes. Subsequently, in step S33, the second error detector 300 searches whether each of the generated morpheme sequences is in the example-based index DB 320.

In step S35, the second error detector 300 extracts the frequencies of appearance of morpheme sequences identical to the generated morpheme sequences. Then, in step S37, the second error detector 300 calculates suitability based on the extracted frequencies. Here, suitability is a score indicating the degree of suitability of arrangement of each morpheme with the corresponding morpheme sequence, and the calculation method thereof is the same as described above.

Subsequently, in step S39, the second error detector 300 constructs a graph from the calculated suitability scores, and may detect errors using the constructed graph. In other words, by determining whether a suitability score is smaller than a threshold or whether a suitability score is drastically reduced by a predetermined value or more, an error section is detected.

Figure 14:
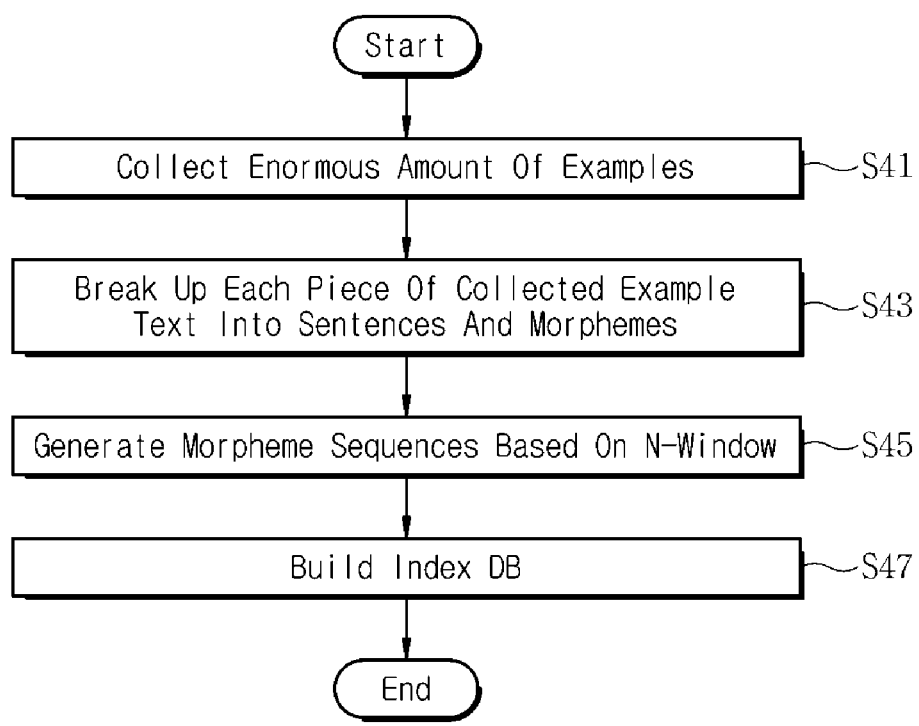
FIG. 14 is a flowchart of an example-based error detecting process according to at least one embodiment of the present disclosure.

FIG. 14 is a flowchart illustrating an example-based error detecting process according to at least one embodiment of the present disclosure.

Referring to FIG. 14, in step S41, the example collection unit 410 of the example builder 400 collects desired example text from enormous data sets exposed through language transmission media, such as the Internet, news, and newspaper articles. At this time, if keywords desired to be collected have been input in advance to collect desired example text, when there is example text in which an input keyword is used, it is possible to automatically collect the example text while monitoring sentence sets exposed through the language transmission media.

Subsequently, in step S43, the example break-up unit 420 of the example builder 400 breaks up each piece of the example text collected by the example collection unit 410 into morphemes. In step S45, the n-gram generation unit 430 of the example builder 400 generates morpheme sequences by binding morphemes based on respective morphemes in an arbitrary window size.

In step S47, the building unit 440 of the example builder 400 matches the morpheme sequences generated in the previous step with the corresponding example text and stores the morpheme sequences and the corresponding example text in the index DB 320.

According to some embodiments of the present disclosure, during syntax analysis of a written input sentence, rules resulting from dependent relationships between adjacent parts of speech are taken into consideration in addition to typical rules of a language, so that accuracy in detecting a grammatical error can be improved. In addition, part-of-speech sequences are generated according to previously defined patterns, and a sentence is analyzed in units of generated parts-of-speech sequences. Therefore, the speed of syntax analysis is high, and it is possible to reduce the vagueness of syntax analysis and also to detect the detailed types of sentence errors. Furthermore, a scheme of detecting an error in syntax according to rules and a scheme of detecting an error using an example are simultaneously performed during automatic sentence evaluation, and thus reliable sentence evaluation can be performed through the two types of sentence error detection.

A method of detecting a grammatical error according to the present disclosure can be implemented in the form of software readable by various computing means and recorded in a non-transitory computer-readable recording medium. Here, the non-transitory computer-readable recording medium can separately include program instructions, data files, data structures, etc. or include a combination thereof. The program instructions recorded in the recording medium are program instructions that are specially designed and configured for the present disclosure, as understood by those of ordinary skill in the art in view of the present disclosure. Examples of the recording medium include magnetic media, such as a hard disk, a floppy disk, and a magnetic tape, optical media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory. The examples of the program instructions include not only machine language code generated by a compiler, but also high-level language code that can be executed by a computer using an interpreter, and so on. The above-described hardware devices may be configured to operate as one or more software modules in order to perform the operation of the present disclosure, and vice versa.

In this specification, exemplary embodiments of the present disclosure have been classified into the first, second and third exemplary embodiments and described for conciseness. However, respective steps or functions of an exemplary embodiment can be combined with those of another exemplary embodiment to implement still another exemplary embodiment of the present disclosure.

Exemplary embodiments of the present disclosure disclosed in the drawings and specification are merely presented specific examples for better understanding, and are not intended to limit the spirit and scope of the claimed invention. Specific terms used in this disclosure and drawings are used for illustrative purposes and not to be considered as limitations of the present disclosure. Exemplary embodiments of the present disclosure have been described for the sake of brevity and clarity. In addition to exemplary embodiments disclosed herein, it will be obvious by those skilled in the art that various changes in form and details are made therein without departing from the spirit and scope of the claimed invention.

What is claimed is:

1. An apparatus for detecting grammatical errors, the apparatus comprising:
   a sentence analyzer configured to
      break up a sentence into units of morphemes,
      tag the morphemes with parts of speech, and
      analyze a syntactic structure of the sentence based on the tagged parts of speech;
   a first error detector configured to
      generate part-of-speech sequences using n-grams of the tagged parts of speech, and detect first grammatical errors by analyzing the generated part-of-speech sequences based on grammatical rules;
a second error detector configured to
generate morpheme sequences by binding the morphemes in a preset n-window size, wherein n is an integer, and
detect second grammatical errors according to frequencies of appearance of morpheme sequences identical to the generated morpheme sequences by searching examples from an example-based index database (DB); and
an integrated error detector configured to determine final grammatical errors in the sentence by combining the detected first grammatical errors and the detected second grammatical errors,
wherein the second error detector comprises a second error detection unit, the second error detection unit is configured to:
search whether or not the morpheme sequences identical to the generated morpheme sequences are in the example-based index DB;
extract the frequencies of appearance of the morpheme sequences identical to the generated morpheme sequences, and calculating respective suitability scores of the morpheme sequences based on the extracted frequencies of appearance; and
detect second grammatical errors by determining whether the suitability scores are smaller than a threshold or whether the suitability scores are changed larger than a predetermined value, and
wherein when the second error unit calculates the suitability scores, the second error detection unit is further configured to, when the morpheme sequences generated in the second error detecting step include both forward morpheme sequences and backward morpheme sequences,
extract frequencies at which each morpheme of the morphemes is arranged with the forward morpheme sequences and the backward morpheme sequences,
calculate suitability scores of each morpheme of the morphemes based on the extracted frequencies, and
calculate an integrated suitability score in consideration of the suitability scores of each morpheme of the morphemes.

2. The apparatus of claim 1, wherein the integrated error detector is configured to, after the first error detector detects the first grammatical errors in the input sentence based on the grammatical rules,
detect the final grammatical errors by using the detected first grammatical errors and the detected second grammatical errors in the sentence based on the searched examples.

3. The apparatus of claim 1, further comprising
an example builder configured to
collect example text including various styles of writing through language transmission media, and
build the example-based index DB by breaking up the collected example text into units of morphemes.

4. The apparatus of claim 1, wherein the first error detector comprises:
a part-of-speech sequence generation unit configured to generate the part-of-speech sequences in units of predetermined windows using the n-grams of the parts of speech tagged to the sentence;
a shallow parser configured to calculate degrees of closeness of the part-of-speech sequence by parsing the part-of-speech sequences based on context free grammar (CFG) rules and regular grammar rules; and
a first error detection unit configured to detect the first grammatical errors in the sentence according to the degrees of closeness calculated by the shallow parser.

5. The apparatus of claim 4, wherein the CFG rules are obtained by standardizing general grammar including a spelling system, articles, and tenses.

6. The apparatus of claim 4, wherein the regular grammar rules include exceptional rules not defined by the CFG rules, and rules defined according to connection relationships or degrees of closeness between adjacent parts of speech.

7. The apparatus of claim 4, wherein the shallow parser is configured to
generate corresponding trees among syntax trees including the part-of-speech sequences as a noun phrase, a compound word, an object phrase, and a subordinate clause when the calculated degrees of closeness of the part-of-speech sequences are larger than a reference value, and
generate derivation trees including words constituting each part-of-speech sequence not as phrases but as independent words when the degrees of closeness are smaller than the reference value.

8. The apparatus of claim 1, wherein the second error detection unit comprising:
an n-gram generation unit configured to generate the morpheme sequences by binding the morphemes in the preset window size in one or more directions of a forward direction and a backward direction;
a search unit configured to search whether or not the morpheme sequences identical to the generated morpheme sequences are in the example-based index DB;
a suitability calculation unit configured to extract the frequencies of appearance of the morpheme sequences identical to the generated morpheme sequences and calculate respective suitability scores of the morpheme sequences based on the extracted frequencies of appearance; and
an error determination unit configured to detect second grammatical errors by determining whether the suitability scores are smaller than a threshold or whether the suitability scores are changed larger than a predetermined value.

9. The apparatus of claim 8, wherein the n-gram generation unit is configured to separately generate a forward morpheme sequence by binding the morphemes arranged in the forward direction in the preset window size and a backward morpheme sequence by binding the morphemes arranged in the backward direction in the preset window size.

10. The apparatus of claim 1, wherein the integrated error detector is configured to determine the first grammatical errors detected by the first error detector prior to the second grammatical errors detected by the second error detector as the final grammatical errors in the sentence.

11. A method performed by an apparatus for detecting grammatical errors, the method comprising:
breaking up a sentence into units of morphemes;
tagging the morphemes with parts of speech;
a first error detecting step of generating part-of-speech sequences in units of predetermined windows using n-grams of the tagged parts of speech, and detecting first grammatical errors in the sentence from the part-of-speech sequences based on grammatical rules;
a second error detecting step of generating morpheme sequences by binding the morphemes in a preset window size in one or more directions of a forward direction and a backward direction, and detecting second grammatical errors in the sentence according to frequencies of appearance of morpheme sequences identical to the generated morpheme sequences by searching examples from an example-based index database (DB); and determining final grammatical errors in the sentence by combining the detected first grammatical errors and the detected second grammatical errors, wherein the second error detecting step comprises:

searching whether or not the morpheme sequences identical to the generated morpheme sequences are in the example-based index DB;

extracting the frequencies of appearance of the morpheme sequences identical to the generated morpheme sequences, and calculating respective suitability scores of the morpheme sequences based on the extracted frequencies of appearance; and detecting second grammatical errors by determining whether the suitability scores are smaller than a threshold or whether the suitability scores are changed larger than a predetermined value, and wherein the calculating of the suitability scores comprises, when the morpheme sequences generated in the second error detecting step include both forward morpheme sequences and backward morpheme sequences, extracting frequencies at which each morpheme of the morphemes is arranged with the forward morpheme sequences and the backward morpheme sequences, calculating suitability scores of each morpheme of the morphemes based on the extracted frequencies, and calculating an integrated suitability score in consideration of the suitability scores of each morpheme of the morphemes.

12. The method of claim 11, wherein the first error detecting step comprises generating corresponding syntax trees among syntax trees including the part-of-speech sequences as a noun phrase, a compound word, an object phrase, and a subordinate clause when calculated degrees of closeness of the part-of-speech sequences are larger than a reference value, and generating derivation trees including words constituting each part-of-speech sequence not as a phrase but as independent words when the degrees of closeness are smaller than the reference value.

13. The method of claim 11, wherein the second error detecting step comprises separately generating a forward morpheme sequence by binding the morphemes arranged in the forward direction in the preset window size and a backward morpheme sequence by binding the morphemes arranged in the backward direction in the preset window size.

14. The method of claim 11, wherein the determining of the final grammatical errors in the sentence comprises determining the final grammatical errors by using the detected first grammatical errors in the sentence based on the grammatical rules and the detected second grammatical errors based on the searched examples.

15. The method of claim 11, wherein the determining of the final errors in the sentence comprises determining the errors detected in the first error detecting step prior to the errors detected in the second error detecting step as the final errors in the sentence.

16. A non-transitory computer-readable recording medium storing a program for causing an apparatus for detecting grammatical errors to execute a method of detecting grammatical errors, the method comprising:

breaking up a sentence into units of morphemes;

tagging the morphemes with parts of speech;

detecting first grammatical errors, the detecting of the first grammatical errors comprising generating part-of-speech sequences in units of predetermined windows using n-grams of the tagged parts of speech, and detecting first grammatical errors in the sentence from the part-of-speech sequences based on grammatical rules;

detecting second grammatical errors, the detecting of the second grammatical errors comprising generating morpheme sequences by binding the morphemes in a preset window size in one or more directions of a forward direction and a backward direction, and detecting second grammatical errors in the sentence according to frequencies of appearance of morpheme sequences identical to the generated morpheme sequences by searching examples from an example-based index database (DB); and determining final grammatical errors in the sentence by combining the detected first grammatical errors and the detected second grammatical errors, wherein the second error detecting step comprises:

searching whether or not the morpheme sequences identical to the generated morpheme sequences are in the example-based index DB;

extracting the frequencies of appearance of the morpheme sequences identical to the generated morpheme sequences, and calculating respective suitability scores of the morpheme sequences based on the extracted frequencies of appearance; and detecting second grammatical errors by determining whether the suitability scores are smaller than a threshold or whether the suitability scores are changed larger than a predetermined value, and wherein the calculating of the suitability scores comprises, when the morpheme sequences generated in the second error detecting step include both forward morpheme sequences and backward morpheme sequences, extracting frequencies at which each morpheme of the morphemes is arranged with the forward morpheme sequences and the backward morpheme sequences, calculating suitability scores of each morpheme of the morphemes based on the extracted frequencies, and calculating an integrated suitability score in consideration of the suitability scores of each morpheme of the morphemes.

17. The non-transitory computer-readable recording medium of claim 16, wherein the detecting of the first grammatical errors comprises generating corresponding syntax trees among syntax trees including the part-of-speech sequences as a noun phrase, a compound word, an object phrase, and a subordinate clause when calculated degrees of closeness of the part-of-speech sequences are larger than a reference value, and generating derivation trees including words constituting each part-of-speech sequence not as a phrase but as independent words when the degrees of closeness are smaller than the reference value.

18. The non-transitory computer-readable recording medium of claim 16, wherein the detecting of the second grammatical errors comprises separately generating a forward morpheme sequence by binding the morphemes arranged in the forward direction in the preset window size and a backward morpheme sequence by binding the morphemes arranged in the backward direction in the preset window size.

* * * * *